US012634531B2

(12) United States Patent　　　　(10) Patent No.:　US 12,634,531 B2
Huang et al.　　　　　　　　　　　　(45) Date of Patent:　　May 19, 2026

(54) VIDEO BITSTREAM ENCAPSULATION METHOD AND APPARATUS, VIDEO BITSTREAM DECODING METHOD AND APPARATUS, AND VIDEO BITSTREAM ACCESS METHOD AND APPARATUS

(71) Applicant: ZTE Corporation, Shenzhen (CN)

(72) Inventors: Cheng Huang, Shenzhen (CN); Yaxian Bai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 7 days.

(21) Appl. No.: 18/691,521

(22) PCT Filed: Oct. 12, 2022

(86) PCT No.: PCT/CN2022/124932

§ 371 (c)(1),
(2) Date: Mar. 13, 2024

(87) PCT Pub. No.: WO2023/078048

PCT Pub. Date: May 11, 2023

(65) Prior Publication Data

US 2025/0039477 A1　　Jan. 30, 2025

(30) Foreign Application Priority Data

Nov. 6, 2021　(CN) .......................... 202111309701.X

(51) Int. Cl.
*H04N 21/2343*　　(2011.01)
*H04N 21/44*　　(2011.01)
*H04N 21/4402*　　(2011.01)

(52) U.S. Cl.
CPC ... *H04N 21/2343* (2013.01); *H04N 21/44008* (2013.01); *H04N 21/4402* (2013.01)

(58) Field of Classification Search
CPC ......... H04N 21/2343; H04N 21/44008; H04N 21/4402; H04N 21/85406; H04N 19/70;
(Continued)

(56) References Cited

U.S. PATENT DOCUMENTS 12,348,757 B2 * 7/2025 Wang ................... H04N 19/172
2016/0373777 A1 * 12/2016 Pettersson ............ H04N 19/105
(Continued)

FOREIGN PATENT DOCUMENTS

CN　　101637028 A　　1/2010
CN　　110876083 A　　3/2020
(Continued)

OTHER PUBLICATIONS

European Search Report for corresponding EP228890763.7; Report dated Nov. 22, 2024.
(Continued)

*Primary Examiner* — Richard T Torrente
(74) *Attorney, Agent, or Firm* — CANTOR COLBURN LLP

(57) ABSTRACT

Embodiments of the present disclosure provide a video bitstream encapsulation method and apparatus, a video bitstream decoding method and apparatus, and a video bitstream access method and apparatus. The video bitstream encapsulation method includes: encapsulating information of a Library Random Access Point (LRAP) sample in a first video bitstream into a media container file in which the first video bitstream is encapsulated; and encapsulating information of a library picture sample of the LRAP sample into the media container file, wherein the library picture sample is a reference picture sample of the LRAP sample.

20 Claims, 7 Drawing Sheets

(58) Field of Classification Search
CPC ............. H04N 21/8455; H04N 19/172; H04N
21/2353; H04N 21/23605; H04N 21/8451
See application file for complete search history.

(56) References Cited

U.S. PATENT DOCUMENTS

| | | |
|---|---|---|
| 2019/0222863 A1 | 7/2019 | Hannuksela et al. |
| 2022/0078515 A1* | 3/2022 | Yu ...................... H04N 21/2362 |

FOREIGN PATENT DOCUMENTS

| | | |
|---|---|---|
| CN | 111526368 A | 8/2020 |
| EP | 3866478 A1 | 8/2021 |
| WO | 2016002140 A1 | 1/2016 |

OTHER PUBLICATIONS

International Search Report for corresponding application PCT/CN2022/124932 filed Oct. 12, 2022; Mail date Jan. 4, 2023.
Gao, Xiaoding, et al. "Standard designs for cross random access point reference in video coding." 2019 Picture Coding Symposium (PCS). IEEE, 2019: 5 pages.
Korean Office Action; Application No. 10-2024-7018914; Filing Date: Jun. 5, 2024; date of mailing: Sep. 29, 2025; 10 pages.

* cited by examiner

IRAP picture                    IRAP picture                    IRAP picture

Input/output device
108

Transmission
device 106

Processor 102

Memory
104

Fig. 3

| |
|---|
| Encapsulate information of a Library Random Access Point (LRAP) sample in a first video bitstream into a media container file in which the first video bitstream is encapsulated |

S302

| |
|---|
| Encapsulate information of a library picture sample of the LRAP sample into the media container file, wherein the library picture sample is a reference picture sample of the LRAP sample |

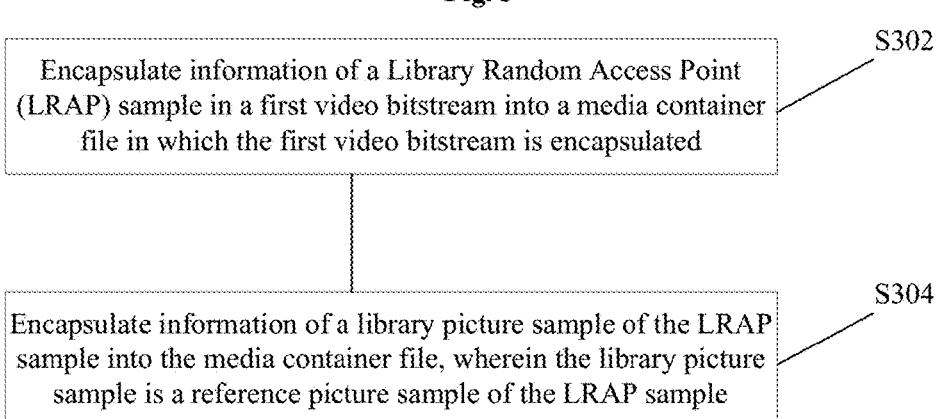

LRAP_type = 1          LRAP_type = 2          LRAP_type = 3

| | | | |
|---|---|---|---|
| ▨ Library picture | ▨ RL picture | ▯ P picture B picture | |

Fig. 5

| |
|---|
| Encapsulate an LRAP sample group and/or LRAP sample group description in a media container file in which a first video bitstream is encapsulated, wherein the LRAP sample group and/or the LRAP sample group description contain information of a Library Random Access Point (LRAP) sample in the first video bitstream and information of a library picture sample of the LRAP sample |

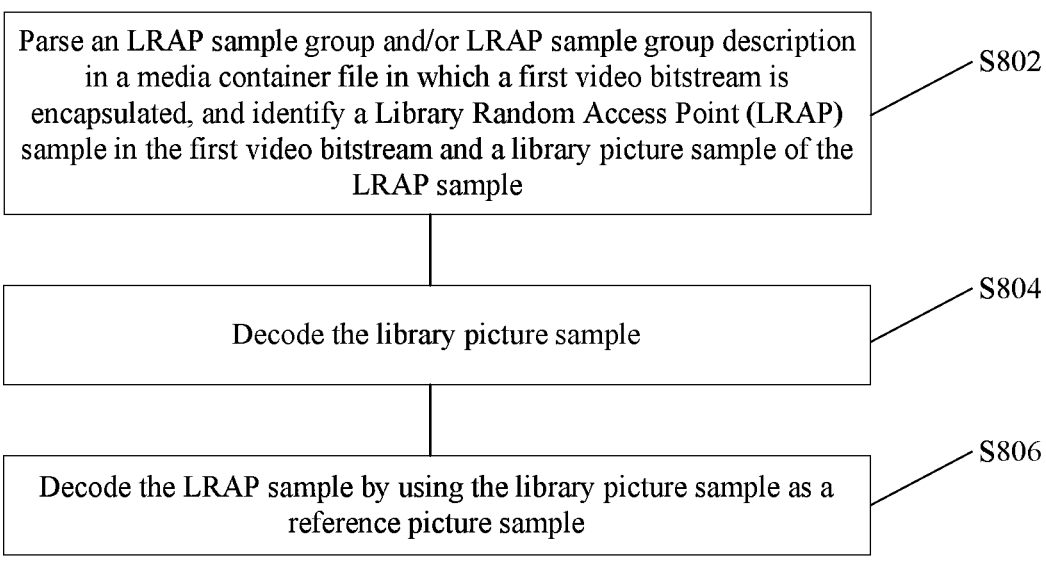

Parse an LRAP sample group and/or LRAP sample group description in a media container file in which a first video bitstream is encapsulated, and identify a Library Random Access Point (LRAP) sample in the first video bitstream and a library picture sample of the LRAP sample — S802

Decode the library picture sample — S804

Decode the LRAP sample by using the library picture sample as a reference picture sample — S806

Fig. 9

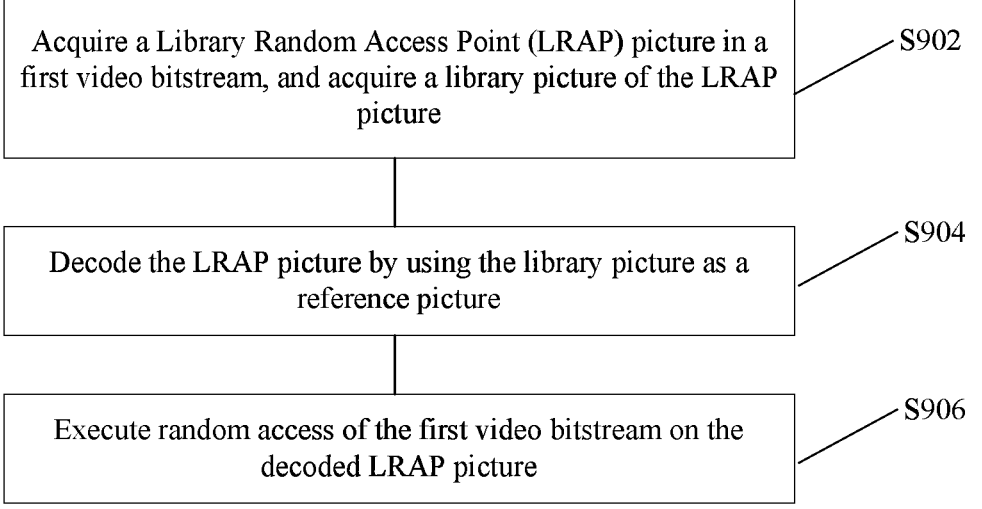

Acquire a Library Random Access Point (LRAP) picture in a first video bitstream, and acquire a library picture of the LRAP picture — S902

Decode the LRAP picture by using the library picture as a reference picture — S904

Execute random access of the first video bitstream on the decoded LRAP picture — S906

Fig. 10

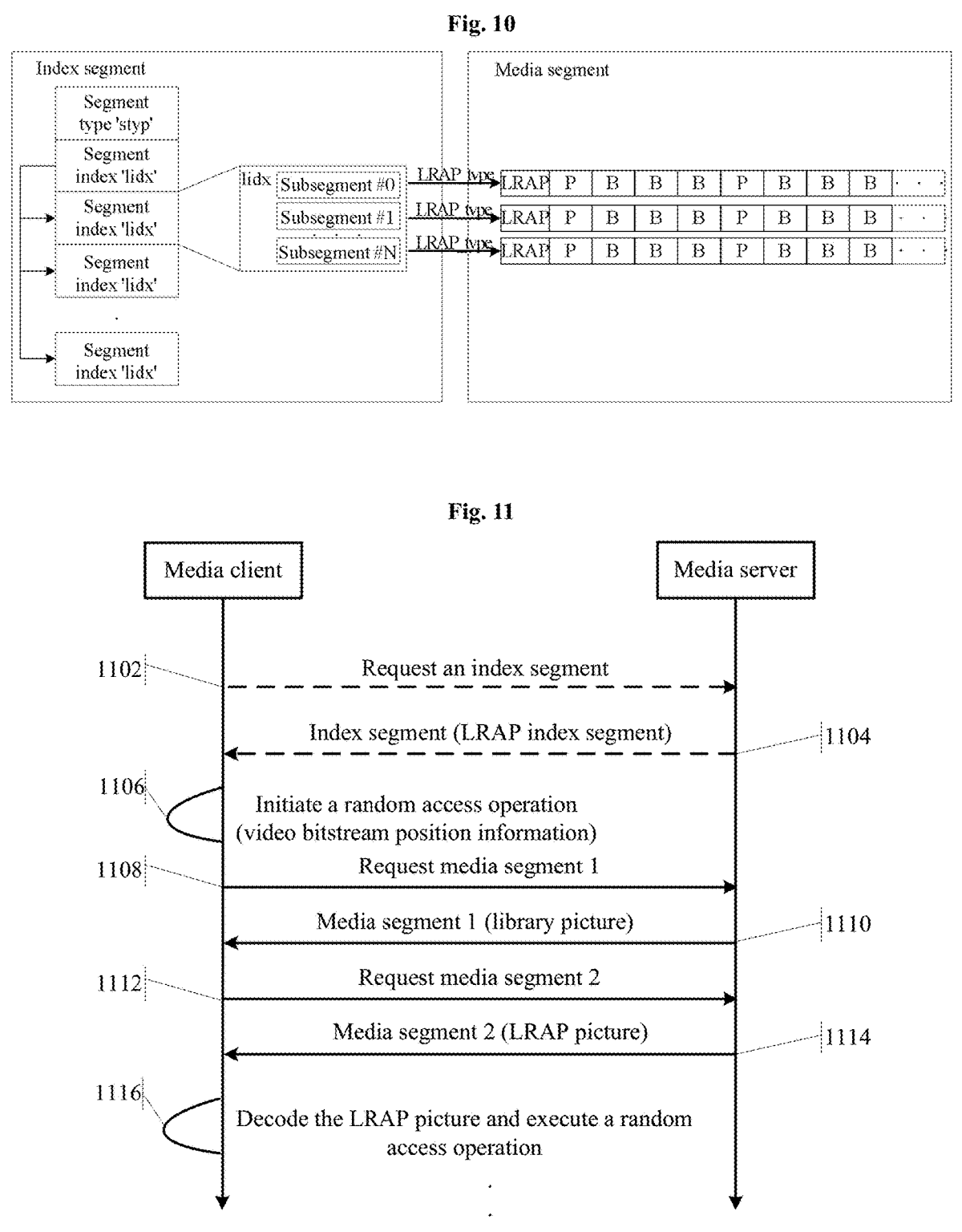

| Index segment | | Media segment |
|---|---|---|

Index segment
- Segment type 'styp'
- Segment index 'lidx'
- Segment index 'lidx'
- Segment index 'lidx'
- .
- Segment index 'lidx' lidx
- Subsegment #0 — LRAP type →
- Subsegment #1 — LRAP type →
- Subsegment #N — LRAP type →

| LRAP | P | B | B | B | P | B | B | B | · · |
|---|---|---|---|---|---|---|---|---|---|
| LRAP | P | B | B | B | P | B | B | B | · · |
| LRAP | P | B | B | B | P | B | B | B | · · |

Fig. 11

| Media client | | Media server |
|---|---|---|

1102 — Request an index segment →

← Index segment (LRAP index segment) — 1104

1106 — Initiate a random access operation (video bitstream position information)

1108 — Request media segment 1 →

← Media segment 1 (library picture) — 1110

1112 — Request media segment 2 →

← Media segment 2 (LRAP picture) — 1114

1116 — Decode the LRAP picture and execute a random access operation

VIDEO BITSTREAM ENCAPSULATION METHOD AND APPARATUS, VIDEO BITSTREAM DECODING METHOD AND APPARATUS, AND VIDEO BITSTREAM ACCESS METHOD AND APPARATUS

CROSS-REFERENCE TO RELATED APPLICATION

The present disclosure is a National Stage Filing of the PCT International Application No. PCT/CN2022/124923 filed on Oct. 12, 2022, which is based on and claims priority to Chinese Patent Application No. CN202111309701.X filed on Nov. 6, 2021 and entitled "Video Bitstream Encapsulation Method and Apparatus, Video Bitstream Decoding Method and Apparatus, and Video Bitstream Access Method and Apparatus", the disclosure of which is incorporated in the present disclosure by reference in its entirety.

TECHNICAL FIELD

Embodiments of the present disclosure relate to the field of communications, and in particular, to a video bitstream encapsulation method and apparatus, a video bitstream decoding method and apparatus, and a video bitstream access method and apparatus.

BACKGROUND

A traditional video codec is a hybrid encoding framework technology based on block division and using temporal prediction and spatial prediction. The video codec uses intra-frame (I) prediction from a current picture to achieve spatial prediction, and uses block-level inter-frame (P) or bi-directional inter-frame (B) prediction to achieve temporal prediction. Generally, an intra-frame (I) encoding block has a much higher encoding cost than an inter-frame (P) encoding block, and the inter-frame (P) encoding block has a higher encoding cost than a bi-directional inter-frame (B) encoding block.

A picture consisting of only intra-frame encoding blocks is referred to as an intra-frame encoded picture, i.e., an I picture. An Intra Random Access Point (IRAP) picture is an I picture, and it is ensured that pictures following the IRAP picture according to a decoding order and a display order do not depend on any picture prior to the IRAP picture in the decoding order. FIG. 1 is a schematic diagram of an IRAP in the related art. As shown in FIG. 1, an IRAP picture can provide an access point for a video bitstream, as all pictures following the IRAP picture according to the decoding and display order can be correctly decoded. However, the video bitstream random access function provided by the IRAP picture is costly as the encoding cost of an intra-frame encoding I picture and the number of bits occupied by the intra-frame encoding I picture are typically much higher compared to those for the inter-frame encoding P picture or the bi-directional intra-frame encoding B picture.

The Audio Video coding Standard Workgroup of China (AVS) workgroup introduces a large-span video encoding technology based on a library picture and a reference library picture (RL picture) in the new-generation video encoding standard (e.g., AVS3 video encoding). The library picture is a long-term reference picture having temporal correlation across random access points in AVS3 video encoding. The RL picture is a P picture or a B picture which only uses the library picture as a reference picture for inter-frame prediction in the AVS3 video encoding. Relevant experiments have proven that using a library picture as a reference picture for inter-frame prediction or bi-directional inter-frame prediction can greatly increase the video encoding efficiency in various application scenarios such as video monitoring and video conference.

Aiming at the problems in the related art that a video encoding manner using a library picture as a reference picture cannot allow for efficient accessing and processing of a video bitstream containing a reference picture sample and the processing is complex, no solution has been proposed.

SUMMARY

Embodiments of the present disclosure provide a video bitstream encapsulation method and apparatus, a video bitstream decoding method and apparatus, and a video bitstream access method and apparatus, which may at least solve the problems in the related art that a video encoding manner using a library picture as a reference picture cannot allow for efficient accessing and processing of a video bitstream containing a reference library picture sample and the processing is complex.

According to some embodiments of the present disclosure, a video bitstream encapsulation method is provided, including:

encapsulating information of a Library Random Access Point (LRAP) sample in a first video bitstream into a media container file in which the first video bitstream is encapsulated; and encapsulating information of a library picture sample of the LRAP sample into the media container file, wherein the library picture sample is a reference picture sample of the LRAP sample.

According to some other embodiments of the present disclosure, a video bitstream decoding method is also provided, including:

identifying, in a media container file in which a first video bitstream is encapsulated, a Library Random Access Point (LRAP) sample in the first video bitstream;

identifying, in the media container file, a library picture sample of the LRAP sample;

decoding the library picture sample; and decoding the LRAP sample by using the library picture sample as a reference picture sample.

According to some other embodiments of the present disclosure, a video bitstream accessing method is also provided, including:

acquiring a Library Random Access Point (LRAP) picture in a first video bitstream, and acquiring a library picture of the LRAP picture;

decoding the LRAP picture by using the library picture as a reference picture; and executing random access of the first video bitstream on the decoded LRAP picture.

According to some other embodiments of the present disclosure, a video bitstream encapsulation apparatus is also provided, including:

a first encapsulation module, configured to encapsulate information of a Library Random Access Point (LRAP) sample in a first video bitstream into a media container file in which the first video bitstream is encapsulated; and a second encapsulation module, configured to encapsulate information of a library picture sample of the LRAP sample into the media container file, wherein the library picture sample is a reference picture sample of the LRAP sample.

According to some other embodiments of the present disclosure, a video bitstream decoding apparatus is also provided, including:

a first identification module, configured to identify, in a media container file in which a first video bitstream is encapsulated, a Library Random Access Point (LRAP) sample in the first video bitstream;

a second identification module, configured to identify, in the media container file, a library picture sample of the LRAP sample;

a first decoding module, configured to decode the library picture sample; and a second decoding module, configured to decode the LRAP sample by using the library picture sample as a reference picture sample.

According to some other embodiments of the present disclosure, a video bitstream access apparatus is also provided, including:

an acquisition module, configured to acquire a Library Random Access Point (LRAP) picture in a first video bitstream, and acquire a library picture of the LRAP picture;

a third decoding module, configured to decode the LRAP picture by using the library picture as a reference picture; and an execution module, configured to execute random access of the first video bitstream on the decoded LRAP picture.

According to still some other embodiments of the present disclosure, further provided is an electronic apparatus, including a memory and a processor; wherein the memory stores a computer program, and the processor is configured to run the computer program to execute the operations in any one of the method embodiments above.

In the embodiments of the present disclosure, information of an LRAP sample in a first video bitstream is encapsulated into a media container file in which the first video bitstream is encapsulated; and information of a library picture sample of the LRAP sample is encapsulated into the media container file, wherein the library picture sample is a reference picture sample of the LRAP sample. The technical solution can solve the problems in the related art that a video encoding manner using a library picture as a reference picture cannot allow for efficient accessing and processing of a video bitstream containing a reference library picture sample and the processing is complex. The information of the LRAP sample is directly encapsulated into the media container file, so as to facilitate identification of the LRAP sample which can serve as a random access point and a library picture sample referred to by the LRAP sample, thereby reducing the processing complexity while satisfying the compression efficiency and avoiding waste of transmission bandwidth.

BRIEF DESCRIPTION OF THE DRAWINGS

FIG. 3 is a flowchart of a video bitstream encapsulation method according to the embodiments of the present disclosure;

FIG. 4 is a schematic diagram of an LRAP according to the embodiments of the present disclosure;

FIG. 5 is a flowchart of a media container file encapsulation method according to some exemplary embodiments of the present disclosure;

FIG. 8 is a flowchart of a video bitstream decoding method according to some exemplary embodiments of the present disclosure;

FIG. 9 is a flowchart of a video bitstream access method according to the embodiments of the present disclosure;

FIG. 10 is a schematic diagram of LRAP index segments according to the embodiments of the present disclosure;

FIG. 11 is a flowchart I of random access based on an LRAP picture according to the embodiments of the present disclosure;

DETAILED DESCRIPTION

Hereinafter, embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or order.

Figures 1, 2:
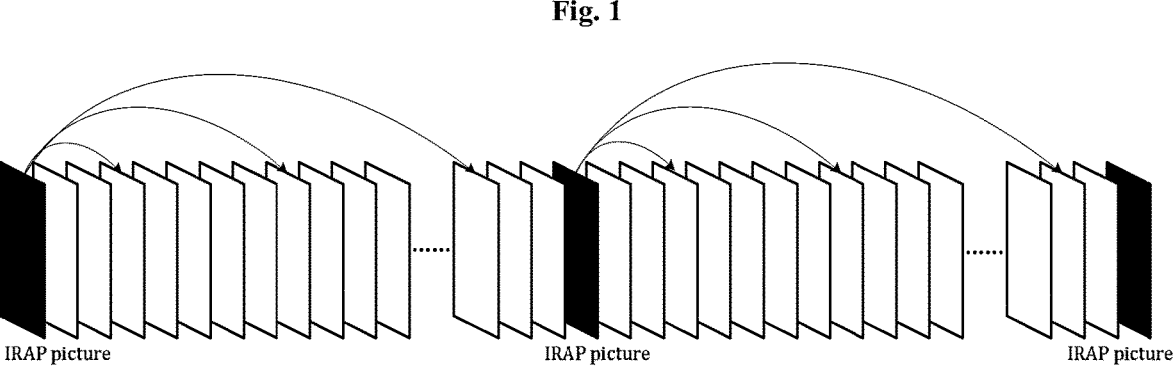
FIG. 1 is a schematic diagram of an IRAP in the related art.
FIG. 2 is a block diagram of the hardware structure of a mobile terminal for implementing a video bitstream encapsulation method according to the embodiments of the present disclosure.

The method embodiments provided in the embodiments of the present disclosure can be executed in a mobile terminal, a computer terminal or a similar computing apparatus. Taking the method embodiments being executed on a mobile terminal as an example, FIG. 2 is a block diagram of the hardware structure of a mobile terminal for implementing a video bitstream encapsulation method according to the embodiments of the present disclosure. As shown in FIG. 2, the mobile terminal may include: one or more (FIG. 2 shows only one) processors 102 (the processors 102 may include, but not limited to processing apparatus such as a microprocessor, MCU or a programmable logic device, FPGA); and a memory 104 for storing data; wherein the mobile terminal can further include a transmission device 106 and an input/output device 108 for communication functions. A person of ordinary skill in the art would understand that the structure as shown in FIG. 2 is merely exemplary, and does not limit the structure of the mobile terminal. For example, the mobile terminal may also include more or fewer components than those shown in FIG. 2, or have different configuration from that shown in FIG. 2.

The memory 104 may be used for storing a computer program, for example, a software program and module of application software, such as a computer program corresponding to the video bitstream encapsulation method in embodiments of the present disclosure; and the processor 102 executes various functional applications and service chain address pool slice processing by running the computer program stored in the memory 104, i.e., implementing the described method. The memory 104 may include a high-speed random access memory, and may also include a non-transitory memory, such as one or more magnetic storage apparatuses, flash memories or other non-transitory solid-state memories. In some examples, the memory 104 may further include memories remotely arranged with respect to the processors 102, and these remote memories may be connected to the mobile terminal via a network. Examples of the network include, but are not limited to the Internet, an intranet, a local area network, a mobile communication network and combinations thereof.

The transmission apparatus 106 is used to receive or send data via a network. Specific examples of the network may include a wireless network provided by a communication provider of the mobile terminal. In one example, the transmission apparatus 106 includes a network adapter (e.g., a Network Interface Controller, short as NIC) which may be connected to other network devices by means of a base station, thereby being able to communicate with the Internet. In one example, the transmission apparatus 106 may be a Radio Frequency (RF) module which is configured to communicate with the Internet in a wireless manner.

The present embodiment provides a video bitstream encapsulation method running on the mobile terminal or a network architecture. FIG. 3 is a flowchart of a video bitstream encapsulation method according to the embodiments of the present disclosure. As shown in FIG. 3, the flow includes the following operations S302 to S304.

In operation S302, information of an LRAP sample in a first video bitstream is encapsulated into a media container file in which the first video bitstream is encapsulated; and In operation S304, information of a library picture sample of the LRAP sample is encapsulated into the media container file, wherein the library picture sample is a reference picture sample of the LRAP sample.

By the operations S302 and S304 above, the problems in the related art that a video encoding manner using a library picture as a reference picture cannot allow for efficient accessing and processing of a video bitstream containing a reference picture sample and the processing is complex, can be solved. The information of the LRAP sample is directly encapsulated into the media container file, so as to facilitate identification of the LRAP sample which can serve as a random access point and a library picture sample referred to by the LRAP sample, thereby reducing the processing complexity while satisfying the compression efficiency and avoiding waste of transmission bandwidth.

In some embodiments, the media container file includes an LRAP sample group and/or LRAP sample group description, wherein the LRAP sample group and/or the LRAP sample group description contain the information of the LRAP sample in the first video bitstream; or the media container file includes a sync sample data box, wherein the sync sample data box contains the information of the LRAP sample in the first video bitstream; or the media container file includes a Stream Access Point (SAP) sample group, wherein the SAP sample group contains the information of the LRAP sample in the first video bitstream; or the media container file includes a segment index data box, wherein the segment index data box indicates information of the LRAP sample in the first video bitstream contained in a segment of encoded video data of the first video bitstream.

In some other embodiments, the media container file includes an LRAP sample group and/or LRAP sample group description, wherein the LRAP sample group and/or LRAP sample group description contain the information of the library picture sample of the LRAP sample; or the media container file includes a sync sample data box, wherein the sync sample data box contains the information of the library picture sample of the LRAP sample; or the media container file includes a Stream Access Point (SAP) sample group, wherein the SAP sample group contains the information of the library picture sample of the LRAP sample; or the media container file includes a segment index data box, wherein the segment index data box indicates information of the library picture sample of the LRAP sample contained in a segment of encoded video data of the first video bitstream.

In some exemplary embodiments, a second video bitstream may also be encapsulated into the media container file, wherein the second video bitstream contains the library picture sample of the LRAP sample.

In some embodiments, the information of the LRAP sample includes at least one of: an index of the LRAP sample, a stream access point type of the LRAP sample, a quantity of library picture samples of the LRAP sample, and a serial number of each library picture sample of the LRAP sample.

In some embodiments, the information of the library picture sample includes at least one of: a track identifier corresponding to the library picture sample and a serial number of the library picture sample.

The video bitstream in this embodiment is a binary data stream formed by encoded pictures. A video sequence is a top-level syntax structure of the video bitstream. The video sequence starts from a sequence header, and a sequence end code or a video editing code indicates the end of the video sequence. The sequence header may appear repeatedly in the bitstream, and therefore is also referred to as a repeated sequence header. Each sequence header is followed by one or more encoded pictures, and there is a picture header prior to each picture. The encoded pictures are arranged in the bitstream according to a bitstream order, and the bitstream order should be the same as a decoding order. The decoding order may be different from a display order.

A "library stream flag" (library_stream_flag) in the sequence header is used to indicate the elementary stream type of a video encoding bitstream. The value of "library stream flag" being '0' indicates that the current bitstream is a main stream, wherein the main stream is a bitstream that can be decoded with reference to library pictures provided by bitstreams other than said bitstream. The value of "library stream flag" being '1' indicates that the current bitstream is a library stream, wherein the library stream is a bitstream only containing a library picture. The library picture may be referred to by pictures in other bitstreams, but is not used for display output.

A "library picture enable flag" (library_picture_enable_flag) in the sequence header is used for indicating whether there is an inter-frame prediction picture using the library picture as a reference picture in the video sequence of the main stream. The value of "library picture enable flag" being '1' indicates that an inter-frame prediction picture using the library picture as a reference picture may exist in the video sequence. The value of "library picture enable flag" being '0' indicates that an inter-frame prediction picture using the library picture as a reference picture should not exist in the video sequence.

In the sequence header or the picture header, "library picture index flag" (library_index_flag [list] [rpls] [i]) indicates whether the reference picture in a reference picture queue is a library picture, and "referenced library picture index" (referenced_library_picture_index [list] [rpls] [i]) indicates a library picture index of a library picture serving as the reference picture.

If an inter-frame prediction picture (a P picture or a B picture) using the library picture as a reference picture exists in the video sequence, and the reference picture queue of the inter-frame prediction picture only has a library picture, then the inter-frame prediction picture is a reference library (RL) picture that only uses the library picture as a reference picture for inter-frame prediction decoding.

A "random access decodable flag" (random_access_de-codable_flag) in an inter-frame prediction picture header indicates whether a current picture only refers to a picture of which a decoding order is after a sequence header corresponding to the current picture and the value of random_ac-cess_decodable_flag is '1'. The corresponding sequence header is a closest sequence header of which the decoding order is before the current picture. If the value of RandomAccessDecodableFlag of the current picture is 0, then the current picture may not be correctly decoded when random access occurs in the corresponding sequence header.

A reference library (RL) picture which satisfies the following characteristic is defined as an LRAP picture. That is, if all library pictures serving as reference pictures can be obtained, all pictures subsequent to the LRAP picture according to a decoding order and a display order can be correctly decoded.

The LRAP picture is a temporal prediction picture only referring to the library picture. The LRAP picture may be encoded as an inter-frame prediction P picture, and may also be decoded as a bi-directional inter-frame prediction B picture. However, unlike conventional temporal prediction P pictures or B pictures, the LRAP picture may constitute a Random Access Point (RAP) in a video bitstream.

The LRAP picture should ensure that all pictures following this LRAP picture according to the decoding and display order will not refer to any picture before the LRAP picture according to the decoding and display order.

When a video bitstream random access operation is executed on the LRAP picture, library pictures in association with the LRAP picture need to be first decoded and used for reference, but no output is displayed. When the random access operation is executed, the LRAP picture and a library picture associated with the LRAP picture are accessed, which can ensure that the LRAP picture pictures subsequent to the LRAP picture according to a display order may be correctly decoded.

The LRAP picture has a library random access point type (LRAP_Type), defined as follows.

LRAP_type is a non-negative integer for representing a stream access point type (SAP_type) corresponding to the LRAP picture if the LRAP picture does not rely on a library picture. When the value of LRAP_type is in the range of 1 to 3, other type values are reserved.

The Stream Access Point (SAP) type depends on correctly-decodable pictures subsequent to the LRAP picture in a decoding order, and arrangement relationship of the pictures in a display order. The stream access point type SAP_type is illustrated as follows:

type 1: corresponding to a "closed GoP random access point", which indicates that all pictures subsequent to the LRAP picture in a decoding order can be correctly decoded; and type 2: a "closed GoP random access point", which indicates that all pictures subsequent to the LRAP picture in a decoding order can be correctly decoded. Moreover, the first picture in a video sequence decoding order starting from the LRAP picture is not the first picture in a display order.

Type 3: "Open GoP random access point", indicating that there are some pictures, which follow the LRAP picture in a decoding order and precede the LRAP picture in a display order, that cannot be correctly decoded.

In some exemplary embodiments, an elementary stream defined in a video bitstream includes:

a main stream, which is a video bitstream which can be decoded and output with reference to library pictures provided by streams other than said stream; and a library stream, which only contains video bits of a library picture. The library picture may be referred to by pictures in other streams, but not for display output.

FIG. 4 is a schematic diagram of an LRAP according to the embodiments of the present disclosure. As shown in FIG. 4, a video sequence starts from a sequence header followed by one or more successive encoded pictures. A video sequence of the library stream can only include library pictures. A video sequence of the main stream may include: P pictures, B pictures, and RL pictures. The P pictures may include library pictures, and a plurality of (past) reference pictures that precede the current picture in a display order. The B pictures may include library pictures, a plurality of (past) reference pictures preceding the current picture in a display order, and a plurality of (future) reference pictures following the current picture in a display order. The RL picture can only include a library picture as a reference picture.

As shown in FIG. 4, a first decoded picture after a sequence header of an i-th video sequence in the main stream is an RL picture and is marked as $RL_{[i,1]}$, and $RL_{[i,1]}$ uses only a library picture as a reference picture. If reference pictures of all pictures following the $RL_{[i,1]}$ picture in a decoding order define the following range: $RL_{[i,1]}$ picture, pictures following the $RL_{[i,1]}$ picture in a display order, and library pictures referenced by the $RL_{[i,1]}$ picture, and all referenced library pictures are available, then all pictures following the $RL_{[i,1]}$ picture in a decoding order can be correctly decoded. Therefore, the $RL_{[i,1]}$ picture is an LRAP picture of "LRAP_type=1" in the video bitstream.

As shown in FIG. 4, another RL picture exists in the i-th video sequence of the main stream, and is marked as $RL_{[i,2]}$, and $RL_{[i,2]}$ uses only a library picture as a reference picture. If reference pictures of all pictures following the $RL_{[i,2]}$ picture in a decoding order define the following range: $RL_{[i,2]}$ picture, pictures following the $RL_{[i,2]}$ picture in a display order, and library pictures referenced by the $RL_{[i,2]}$ picture, and all referenced library pictures are available, then all pictures following the $RL_{[i,2]}$ picture in a decoding order can be correctly decoded. Moreover, if the $RL_{[i,2]}$ picture is not a first picture in the video sequence starting from the $RL_{[i,2]}$ picture in a display order (e.g, the display order of picture $P_{[i,2]}$ is before the $RL_{[i,2]}$ picture in FIG. 6), then the $RL_{[i,1]}$ picture is an LRAP picture of "LRAP_type=2" in the video bitstream.

As shown in FIG. 4, another RL picture exists in the i-th video sequence of the main stream, and is marked as $RL_{[i,3]}$, and $RL_{[i,3]}$ uses only a library picture as a reference picture. If there are some pictures of which the decoding order is after the $RL_{[i,3]}$ picture and the display order is before the $RL_{[i,3]}$ picture, such as picture $P_{[i,3]}$ in FIG. 4, if the picture $P_{[i,3]}$ refers to pictures of which the decoding order or display order is before the $RL_{[i,3]}$ picture, then the picture $P_{[i,3]}$ cannot be correctly decoded when the $RL_{[i,3]}$ picture executes video bitstream random access. Therefore, the $RL_{[i,3]}$ picture is an LRAP picture of "LRAP_type=3" in the video bitstream.

As shown in FIG. 4, another RL picture exists in the i-th video sequence of the main stream, and is marked as $RL_{[i,4]}$, and $RL_{[i,4]}$ uses only a library picture as a reference picture. If there are some pictures of which the decoding order and display order are both after the $RL_{[i,4]}$ picture, for example, picture $P_{[i,4]}$ in FIG. 6, if the picture $P_{[i,4]}$ refers to pictures of which the decoding order or display order is before the $RL_{[i,4]}$ picture, then the picture $P_{[i,4]}$ cannot be correctly decoded starting from the $RL_{[i,4]}$ picture, and video bitstream random access cannot be executed on the $RL_{[i,4]}$ picture. Therefore, the $RL_{[i,4]}$ picture is not an LRAP picture in the video bitstream.

International Standard Organization (ISO) Base Media File Format (ISOBMFF)

The ISO base media file format defines a general structure of a time-based media container file (such as video and audio), and may serve as a basis for other media file formats such as MPEG-4 Part 14 container format (MP4) and 3GPP file format (3GP). The ISO base media file format supports local editing and play-back of media, and network transfer through various stream transfer mechanisms, including: Real-time Transport Protocol (RTP) and dynamic adaptive stream transfer based on HyperText Transfer Protocol (HTTP).

The present embodiment may be used for video bitstream data encapsulation and processing, and the video bitstream is encapsulated into an ISOBMFF container file. The ISO base media file format is composed of several data boxes (Box), each of which has a type and a length and can be considered as one data object. One data box may contain another data box, referred to as a container data box. The ISO base media file has one and only one file type 'ftyp' data box, and as a flag of a file format, the ISO base media file has one and only one movie 'moov' data box, which contains media metadata information. The movie data box typically includes one or more tracks, each track residing in a track 'trak' data box. There are many types of tracks, such as media tracks and metadata tracks. Media data of an ISO base media file is contained in a media data 'mdat' data box, and the structure of the media data is described by metadata.

In some exemplary embodiments, the track type of encapsulating the video bitstream into the media container file includes:

a main stream track: a non-library picture in a video bitstream encoded picture is encapsulated into a sample and/or sample entry of the main stream track to represent the main stream in the video bitstream, and the main stream track may refer to a library stream track; and a library stream track: a library picture in a video bitstream encoded picture is encapsulated into a sample and/or sample entry of the library stream track to represent a library stream in the video bitstream, and the library stream track is referenced by a main stream track via an 'a3lr' track.

Track reference of 'a3lr' type may be included in the main stream track. When present, the track reference refers to an AVS3 library stream track from the main stream track.

In a media container file syntax structure, a sample group groups samples in a media track on the basis of a particular grouping criteria. A sample group data box (SampleToGroupBox) in an ISO base media file format indicates a sample group to which a sample belongs, and a sample group description data box (SampleGroupDescriptionBox) provides a relevant description of the sample group.

FIG. 5 is a flowchart of a media container file encapsulation method according to some exemplary embodiments of the present disclosure. As shown in FIG. 5, the flow includes the following operation S502.

In operation S502, an LRAP sample group and/or LRAP sample group description are encapsulated into a media container file in which a first video bitstream is encapsulated, wherein the LRAP sample group and/or the LRAP sample group description contain information of an LRAP sample in the first video bitstream and information of a library picture sample of the LRAP sample.

By operation S502 above, the problems in the related art that a bitstream or media container file containing a reference library (RL) picture or sample cannot be efficiently accessed and processed and unnecessary processing complexity is brought about can be solved.

In some exemplary implementations of the embodiment, operation S502 may include:

an LRAP sample group is included in the media container file, wherein the sample group contains information of an LRAP sample in the first video bitstream.

LRAP Sample Group

An LRAP sample group indicates LRAP samples in a video bitstream and information of the library picture samples as reference picture samples.

A member of the library random access point sample group (referred to as an LRAP sample) shall satisfy the following conditions:

the LRAP sample can only use a library picture sample as a reference picture sample; and after decoding the referenced library picture samples, decoding from the LRAP sample can allow for correctly decoding of the LRAP sample and all samples following the LRAP sample in a display order.

The LRAP sample can only be used in combination with a library picture sample referred to by the LRAP sample. In order to create a decodable sample sequence, the library picture sample and the LRAP sample and samples following the LRAP sample in a display order need to be connected in series.

```
Syntax:
class VisualLRAPEntry extend VisualSampleGroupEntry ('lrap')
{
    unsigned int(3) LRAP_type;
    unsigned int(3) entry_count;
    unsigned int(2) reserved = 0;
    int i;
    for (i=0; i < entry_count; i++) {
    unsigned int(9) library_sample_number;
    unsigned int(7) reserved = 0;
    }
}
```

The LRAP_type is a non-negative integer for representing a stream access point type (SAP_type) corresponding to the LRAP sample if the LRAP sample does not rely on a library picture sample. When the value of LRAP_type is in the range of 1 to 3, other type values are reserved.

entry_count is a non-negative integer for representing a quantity of library picture samples referenced by the LRAP sample in the group. The entry_count value being '001' indicates that a quantity of library picture samples referenced by the LRAP sample in the group is 1; and values '000' and '010'-'111' are reserved. If the entry_count value is '000', the table below is empty, at which point the sample group does not provide information of the library picture sample.

The library_sample_number is a non-negative integer, and provides the sample serial number of the library picture sample referenced by the LRAP sample in the group.

Figure 6:
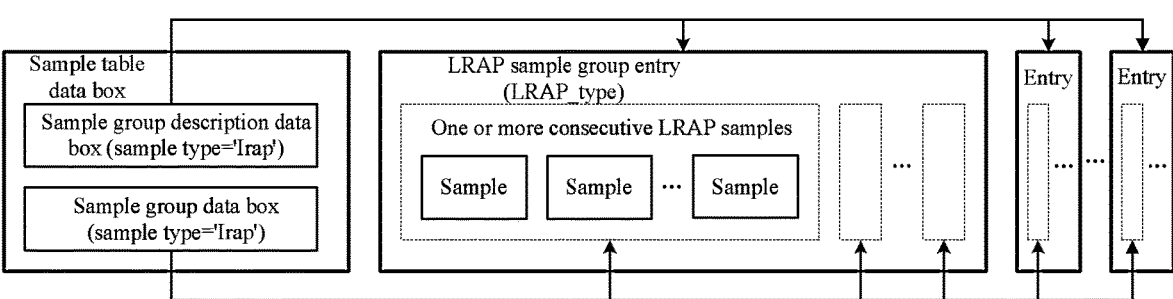
FIG. 6 is a schematic diagram of an LRAP sample group and LRAP sample group description according to the embodiments of the present disclosure.

FIG. 6 is a schematic diagram of an LRAP sample group and LRAP sample group description according to the embodiments of the present disclosure. As shown in FIG. 6, in order to simplify access and processing of the LRAP sample of the video bitstream, in this embodiment, an LRAP sample group of a group type 'Irap' and LRAP sample group description are defined for a media volume file encapsulating the video bitstream.

A sample table data box (SampleTableBox) or a track fragment data box (TrackFragmentBox) of each movie fragment data box (MovieFragmentBoxes) in the ISO base media file format contain the LRAP sample group and the LRAP sample group description. The LRAP sample group data box provides positioning information (for example, a sample index) of each LRAP sample in the video bitstream and an LRAP sample group entry to which each LRAP sample belongs. The LRAP sample group description data box provides description information of LRAP samples in the same LRAP sample group entry, and at least includes one of: a stream access point type of the LRAP sample, a quantity of library picture samples of the LRAP sample, and a serial number of each library picture sample of the LRAP sample.

A sync sample data box 'stss' in the ISO base media file format provides compact marking of sync samples in the video bitstream.

```
Syntax:
aligned(8) class SyncSampleBox
    extends FullBox('stss', version = 0, 0) {
    unsigned int(32) entry__count;
    int i;
    for (i=0; i < entry__count; i++) {
        unsigned int(32) sample__number;
    }
}
```

In some embodiments, a sync sample data box is encapsulated into a media container file in which a first video bitstream is encapsulated, wherein the sync sample data box contains information of an LRAP sample in the first video bitstream and information of a library picture sample of the LRAP sample.

By the operations above, the problems in the related art that a bitstream or media container file containing a reference library (RL) picture or sample cannot be efficiently accessed and processed and unnecessary processing complexity is brought about can be solved.

A Stream Access Point (SAP) in the ISO base media file format allows random access to a container of media streams, and a SAP sample group identifies a sample as an indicated SAP type.

```
Syntax:
aligned(8) class SyncSampleBox class SAPEntry( ) extends
SampleGroupDescriptionEntry('sap ')
    {
    unsigned int(1) dependent__flag;
    unsigned int(3) reserved;
    unsigned int(4) SAP__type;
}
```

In some embodiments, a Stream Access Point (SAP) sample group is encapsulated into a media container file in which a first video bitstream is encapsulated, wherein the SAP sample data group contains information of an LRAP sample in the first video bitstream and information of a library picture sample of the LRAP sample.

By the operations above, the problems in the related art that a bitstream or media container file containing a reference library (RL) picture or sample cannot be efficiently accessed and processed and unnecessary processing complexity is brought about can be solved.

Figure 7:
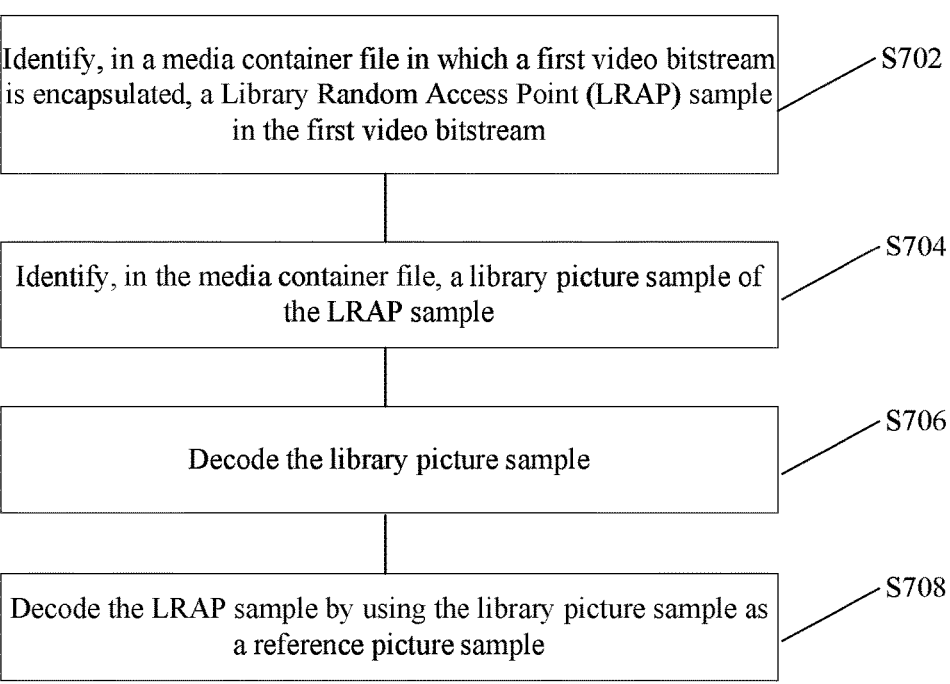
FIG. 7 is a flowchart of a video bitstream decoding method according to the embodiments of the present disclosure.

FIG. 7 is a flowchart of a video bitstream decoding method according to the embodiments of the present disclosure. As shown in FIG. 7, the flow includes the following operations S702 to S708.

In operation S702, an LRAP sample in the first video bitstream is identified in a media container file in which the first video bitstream is encapsulated.

In some exemplary implementations of the present embodiment, operation S702 may include: an LRAP sample group and/or LRAP sample group description in the media container file are parsed, and since the LRAP sample group and/or the LRAP sample group description contain information of the LRAP sample, the LRAP sample in the first video bitstream can be obtained on the basis of the LRAP sample group and/or the LRAP sample group description; or a sync sample data box in the media container file is parsed, and since the sync sample data box contains information of the LRAP sample, the LRAP sample in the first video bitstream can be obtained on the basis of the sync sample data box; or a Stream Access Point (SAP) sample group in the media container file is parsed, and since the SAP sample group contains information of the LRAP sample, the LRAP sample in the first video bitstream can be obtained on the basis of the Stream Access Point (SAP) sample group; or a segment index data box in the media container file is parsed, and since the segment index data box indicates information of the LRAP sample, the LRAP sample in the first video bitstream can be obtained on the basis of the segment index data box.

In operation S704, a library picture sample of the LRAP sample is identified in the media container file.

In some exemplary implementations of the present embodiment, operation S704 may include: an LRAP sample group and/or LRAP sample group description in the media container file are parsed, wherein the LRAP sample group and/or the LRAP sample group description contain the information of the library picture sample of the LRAP sample; or a sync sample data box in the media container file is parsed, wherein the sync sample data box contains the information of the library picture sample of the LRAP sample; or a Stream Access Point (SAP) sample group in the media container file is parsed, wherein the SAP sample group contains the information of the library picture sample of the LRAP sample; or a segment index data box in the media container file is parsed, wherein the segment index data box indicates information of the library picture sample of the LRAP sample contained in a segment of encoded video data of the first video bitstream; and a library picture sample of the LRAP sample can be identified according to the information of the library picture sample.

In operation S706, the library picture sample is decoded.

In some exemplary implementations of the present embodiment, operation S706 may include: a library picture sample of the LRAP sample contained in a second video bitstream encapsulated in the media container file is decoded according to the information of the library picture sample of the LRAP sample.

In operation S708, the LRAP sample is decoded by using the library picture sample as a reference picture sample.

By operations S702-S708 above, the problems in the related art that a video encoding manner using a library picture as a reference picture cannot allow for efficient accessing and processing of a video bitstream containing a reference library picture sample, the processing is complex, and decoding can be completed only when the download amount is large can be solved. An LRAP sample that can serve as a random access point and a library picture sample referred to by the LRAP sample are directly identified from a media container file, and decoding can be completed while reducing the download amount.

In embodiments of the present disclosure, the information of the LRAP sample includes at least one of: an index of the LRAP sample, a stream access point type of the LRAP sample, a quantity of library picture samples of the LRAP sample, and a serial number of each library picture sample of the LRAP sample.

In embodiments of the present disclosure, the information of the library picture sample includes at least one of: a track identifier corresponding to the library picture sample and a serial number of the library picture sample.

FIG. 8 is a flowchart of a video bitstream decoding method according to some exemplary embodiments of the present disclosure. As shown in FIG. 8, the flow includes the following operations S802 to S806.

In operation S802, an LRAP sample group and/or LRAP sample group description are parsed in a media container file in which a first video bitstream is encapsulated, and an LRAP sample in the first video bitstream and a library picture sample of the LRAP sample are identified.

In operation S804, the library picture sample is decoded.

In operation S806, the LRAP sample is decoded by using the library picture sample as a reference picture sample.

By operations S802-S806 above, the problems in the related art that a bitstream or media container file containing a reference library (RL) picture or sample cannot be efficiently accessed and processed and unnecessary processing complexity is brought about can be solved.

In some embodiments, a sync sample data box is parsed in a media container file in which a first video bitstream is encapsulated, and an LRAP sample in the first video bitstream and a library picture sample of the LRAP sample are identified; the library picture sample is decoded; and the LRAP sample is decoded by using the library picture sample as a reference picture sample. The problems in the related art that a bitstream or media container file containing a reference library (RL) picture or sample cannot be efficiently accessed and processed and unnecessary processing complexity is brought about can be solved.

In some embodiments, a Stream Access Point (SAP) sample group is parsed in a media container file in which a first video bitstream is encapsulated, and an LRAP sample in the first video bitstream and a library picture sample of the LRAP sample are identified; the library picture sample is decoded; and the LRAP sample is decoded by using the library picture sample as a reference picture sample. The problems in the related art that a bitstream or media container file containing a reference library (RL) picture or sample cannot be efficiently accessed and processed and unnecessary processing complexity is brought about can be solved.

FIG. 9 is a flowchart of a video bitstream access method according to the embodiments of the present disclosure. As shown in FIG. 9, the flow includes the following operations S902 to S906.

In operation S902, an LRAP picture in a first video bitstream is acquired, and a library picture of the LRAP picture is acquired.

In some exemplary implementations of the embodiment, in operation S902, the operation that an LRAP picture in a first video bitstream is acquired may include: a first segment of encoded video data of the first video bitstream is received, wherein the first segment contains at least one LRAP picture; and/or in operation S902, the operation that a library picture of the LRAP picture is acquired may include: a second segment of encoded video data of a second video bitstream is received, wherein the second segment contains the library picture; or a third segment of encoded video data of the first video bitstream is received, wherein the third segment contains the library picture.

In some other exemplary implementations of the embodiment, operation S902 may include: a fourth segment of encoded video data of the first video bitstream is received, wherein a first subsegment of the fourth segment contains the library picture, and a second subsegment of the fourth segment contains at least one LRAP picture; and the library picture can be acquired from the first subsegment of the fourth segment, and the LRAP picture can be acquired from the second subsegment of the fourth segment.

In still some other exemplary implementations of the embodiment, in operation S902, the operation that an LRAP picture in a first video bitstream is acquired may include: an index segment of encoded video data of the first video bitstream is received, wherein the index segment indicates that the LRAP picture is present in a media segment of the encoded video data of the first video bitstream. Additionally or alternatively, in some exemplary implementations of the embodiment, in operation S902, the operation that a library picture of the LRAP picture is acquired may include: an index segment of encoded video data of the first video bitstream is received, wherein the index segment indicates that the library picture is present in a media segment of the encoded video data of the first video bitstream, or an index segment of encoded video data of a second video bitstream is received, wherein the index segment indicates that the library picture is present in a media segment of the encoded video data of the second video bitstream.

In operation S904, the LRAP picture is decoded by using the library picture as a reference picture.

In operation S906, random access of the first video bitstream is executed on the decoded LRAP picture.

By operations S902-S906, the problems in the related art that a video encoding manner using a library picture as a reference picture cannot allow for efficient accessing and processing of a video bitstream containing a reference library picture sample, the processing is complex and the access frequency is low can be solved. An LRAP picture that can serve as a random access point and a library picture referred to by the LRAP sample are directly identified from a media container file, and decoding can be completed while reducing the download amount. While satisfying the compression efficiency and avoiding waste of transmission bandwidth, a random access frequency of a video bitstream is increased, and the time delay is reduced.

In some exemplary embodiments, after operation S904, the method may further include: at least one non-random access point picture, which is subsequent to the LRAP picture in a decoding order and display order, in the first video bitstream is decoded, wherein the at least one non-random access point picture does not use any picture preceding the LRAP picture in the decoding order or display order as a reference picture, thereby facilitating implementing of random access.

LRAP Segment Index

In a media container file syntax structure, a segment index is used to provide compact index information of one media stream within a segment. A segment index data box (SegmentIndexBox) in an ISO base media file format records how a segment is divided into one or more subsegments. The subsegment is defined as a media presentation time interval of the subsegment, and corresponds to a byte range of the subsegment. Segment index information and indexed media content may be encapsulated into the same file, and may be stored in separate files.

Definition

An LRAP segment index data box (LRAPSegmentIndexBox) indicates that an LRAP exists in a subsegment referred to thereby, and satisfies:

if a media stream (track fragment) referenced in the subsegment contains an LRAP, then the subsegment contains the LRAP and starts with the LRAP.

LRAP samples (LRAP_type 1, 2, or 3) in the subsegment are marked as members of a sample group of an 'lrap' group type.

```
Syntax:
aligned(8) class LRAPSegmentIndexBox extends FullBox('lidx',
version, 0) {
    for(i=1; i <= reference_count; i++)
    {
        bit (1)                    reference_type;
        unsigned int(31)           referenced_size;
        unsigned int(32)           subsegment_duration;
        bit(1)                        starts_with_LRAP;
        unsigned int(3)            LRAP_type;
        unsigned int(28)           reserved = 0;
    }
}
``` wherein starts_with_LRAP indicates whether the referenced subsegment starts with an LRAP. LRAP_type indicates an LRAP_type of an LRAP in a subsegment.

LRAP Index Segment

Dynamic Adaptive Streaming over HTTP (DASH) supports different media formats such as audio, video and text, and can provide high-quality streaming services with various code rates, frame rates and resolutions. Media Presentation Description (MPD) contains metadata required for a DASH client providing a streaming service TO a user, and is divided into multiple layers, including Period, AdaptationSet, Representation and Segment, so as to cover different terminal playback capabilities and network bandwidth requirements.

Segment formats define syntax and semantics of resources associated with HTTP-URL in the Media Presentation Description (MPD). Index Segments are composed of a series of data boxes in an ISO base media file format, and are used for providing index information of Media Segments.

An index segment may be associated with a single media segment, or may be associated with all media segments in a Representation.

FIG. 10 is a schematic diagram of LRAP index segments according to the embodiments of the present disclosure. As shown in FIG. 10, an index segment provides indexes of all media segments of one Representation in dynamic adaptive streaming. The index segment starts with a "styp" type data box, each media segment in Representation is indexed by one or more segment index data boxes, and segment indexes of each media segment are connected in sequence and are indexed by the outermost segment index data box.

As shown in FIG. 10, one media segment contains N consecutive subsegments, and each subsegment is indexed by a segment index data box of 'lidx' type. The 'lidx' data box indicates whether the referenced subsegment starts with an LRAP, and the LRAP_type of the LRAP in the subsegment.

In LRAP random access, multiple user operations may trigger a random access request for a video bitstream. In broadcast and multicast services, channel switching will trigger a random access operation for video bitstreams in another channel. In an adaptive streaming session, special effect playback such as drag playback and fast forward/backward will trigger a random access operation for video bitstreams in the current Representation. A code rate adaptive switching will trigger a random access operation for video bitstreams in another Representation.

An LRAP picture of this embodiment is introduced into the video bitstream and a random access operation is executed on this basis; and compared with an intra-frame encoded random access point (IRAP) picture, a random access operation may be achieved at a lower encoding cost.

A video bitstream random access request typically indicates a desired position (time) in a video bitstream.

In some exemplary implementations, an associated LRAP picture in the video bitstream random access is an LRAP picture that is closest in time and precedes the desired position or appears at the desired position.

In some embodiments, by looking up samples contained in an LRAP sample group, an associated LRAP sample in the video bitstream random access and a corresponding library picture sample can be positioned.

In some exemplary implementations, an associated segment in the video bitstream random access refers to a segment that contains at least one LRAP picture. One LRAP picture is an LRAP picture that is closest in time and precedes the desired position or appears at the desired position.

In some embodiments, by looking up segments to which an LRAP segment index corresponds, an associated segment in the video bitstream random access can be positioned, and the segment contains at least one associated LRAP picture in the video bitstream random access.

In some exemplary implementations, an associated subsegment in the video bitstream random access refers to a subsegment starting with the LRAP picture. An LRAP picture is an LRAP picture that is closest in time and precedes the desired position or appears at the desired position.

In some embodiments, by looking up subsegments to which an LRAP segment index refers, an associated subsegment in the video bitstream random access can be positioned, and the subsegment contains an LRAP picture in the video bitstream random access.

FIG. 11 is a flowchart I of random access based on an LRAP picture according to the embodiments of the present disclosure. As shown in FIG. 11, the flow includes the following operations S1102 to S1116.

In operation S1102, in a streaming session process, a media client (for example, a DASH client) requests to acquire an index segment from a server, wherein the index segment provides indexes of all media segments in a Representation.

In operation S1104, the server returns an index segment to the client. In this embodiment, the index segment consists of a series of LRAP segment index data boxes (LRAPSegmentIndexBox), and indicates whether an LRAP picture exists in subsegments to which the media segments refer, and indicates a random access point type (LRAP_type) of the LRAP picture.

In operation S1106, the client receives a video bitstream random access request initiated by a user. According to the request, the client determines a desired position in the video bitstream. In some exemplary implementations, by looking up LRAP segment indexes provided by the index segment, an associated segment in the video bitstream random access is positioned, and the segment contains at least one associated LRAP picture in the video bitstream random access.

In some exemplary implementations, by the LRAP segment indexes provided by the index segment, a library picture corresponding to an associated LRAP in the video bitstream random access can be positioned.

In some exemplary implementations, by looking up samples contained in an LRAP sample group, a library picture sample corresponding to an associated LRAP sample in the video bitstream random access can be positioned.

In operation S1108, the client requests from the server to acquire a media segment of a library picture corresponding to an associated LRAP picture in the video bitstream random access.

In some exemplary implementations, the client requests from the server to acquire media segments in the same Representation, that is, the library picture and the LRAP picture are encoded in the same video bitstream.

In some exemplary implementations, the client requests from the server to acquire media segments in different Representations, that is, the library picture and the LRAP picture are encoded in different video bitstreams.

In operation S1110, the server returns a media segment to the client, wherein the segment contains a library picture corresponding to an associated LRAP picture in the video bitstream random access.

In operation S1112, the client requests from the server to acquire the associated media segment in the video bitstream random access.

In operation S1114, the server returns a media segment to the client, wherein the segment contains at least one associated LRAP picture in the video bitstream random access.

In operation S1116, the client decodes the LRAP picture by using the library picture as a unique reference picture, and executes a random access operation on the decoded LRAP picture.

In some exemplary implementations, at least one non-random access point picture, which is subsequent to the LRAP picture in a decoding order and display order, is decoded, wherein the non-random access point picture does not use any picture preceding the LRAP picture in the decoding order or display order as a reference picture.

Figure 12:
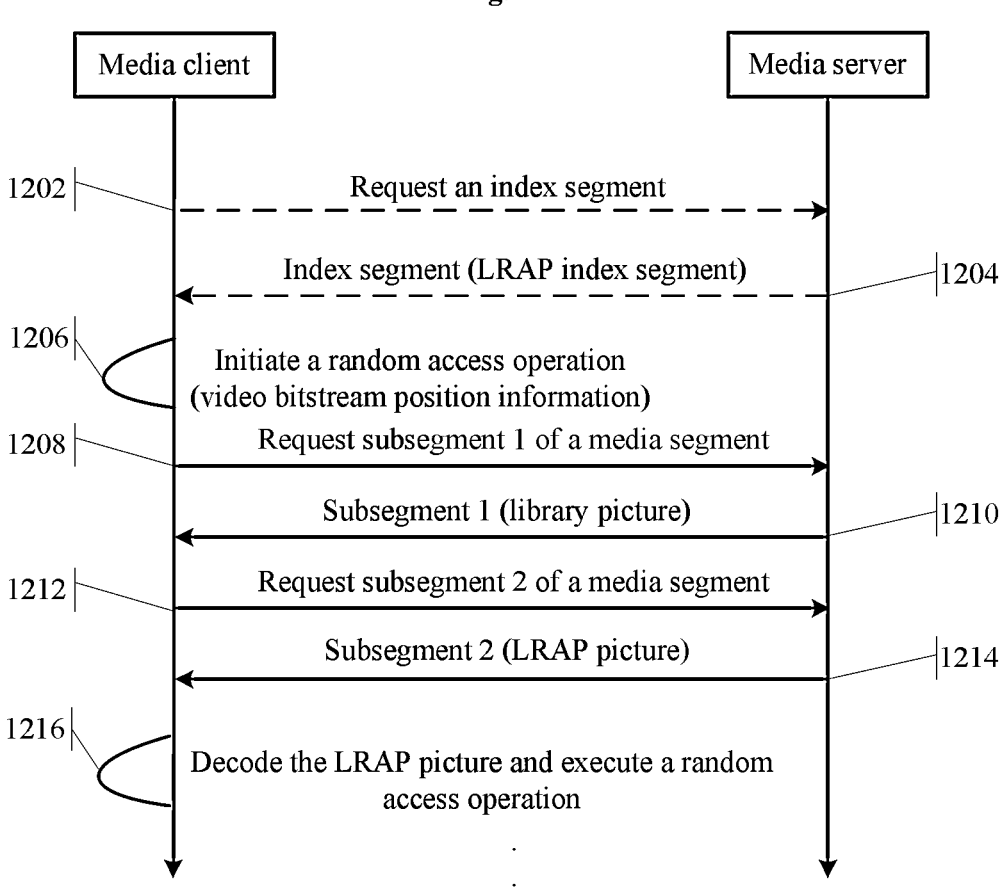
FIG. 12 is a flowchart II of random access based on an LRAP picture according to the embodiments of the present disclosure.

FIG. 12 is a flowchart II of random access based on an LRAP picture according to the embodiments of the present disclosure. As shown in FIG. 12, the flow includes the following operations S1202 to S1216.

In operation S1202, in some exemplary implementations, in a streaming session process, a media client (for example, a DASH client) requests to acquire an index segment from a server, wherein the index segment provides indexes of all media segments in a Representation.

In operation S1204, the server returns an index segment to the client. In this embodiment, the index segment consists of a series of LRAP segment index data boxes (LRAPSegmentIndexBox), and indicates whether an LRAP picture exists in subsegments to which the media segments refer, and indicates a random access point type (LRAP_type) of the LRAP picture.

In operation S1206, the client receives a video bitstream random access request initiated by a user. According to the request, the client determines a desired position in the video bitstream. In some exemplary implementations, by looking up LRAP segment indexes provided by the index segment, an associated segment and subsegments thereof in the video bitstream random access are positioned, and the subsegment starts with an associated LRAP picture in the video bitstream random access.

In some exemplary implementations, by the LRAP segment indexes provided by the index segment, a library picture corresponding to an associated LRAP in the video bitstream random access can be positioned.

In some exemplary implementations, by looking up samples contained in an LRAP sample group, a library picture sample corresponding to an associated LRAP sample in the video bitstream random access can be positioned.

In some exemplary implementations, by looking up LRAP segment indexes provided by the index segment, an associated segment and subsegments thereof in the video bitstream random access are positioned, and the subsegment contains a library picture corresponding to an associated LRAP picture in the video bitstream random access.

In operation S1208, the client requests from the server to acquire a subsegment of a library picture corresponding to an associated LRAP picture in the video bitstream random access.

In operation S1210, the server returns a subsegment to the client, wherein the subsegment contains a library picture corresponding to an associated LRAP picture in the video bitstream random access.

In operation S1212, the client requests from the server to acquire the associated subsegment in the video bitstream random access.

In operation S1214, the server returns a subsegment to the client, wherein the subsegment starts with an associated LRAP picture in the video bitstream random access.

In operation S1216, the client decodes the LRAP picture by using the library picture as a unique reference picture, and executes a random access operation on the decoded LRAP picture.

In some exemplary implementations, at least one non-random access point picture, which is subsequent to the LRAP picture in a decoding order and display order, is decoded, wherein the non-random access point picture does not use any picture preceding the LRAP picture in the decoding order or display order as a reference picture.

Figure 13:
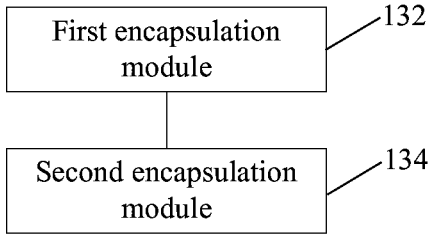
FIG. 13 is a block diagram of a video bitstream encapsulation apparatus according to the embodiments of the present disclosure.

The embodiments of the present disclosure further provide a video bitstream encapsulation apparatus. FIG. 13 is a block diagram of a video bitstream encapsulation apparatus according to the embodiments of the present disclosure. As shown in FIG. 13, the apparatus includes:

a first encapsulation module 132, configured to encapsulate information of an LRAP sample in a first video bitstream into a media container file in which the first video bitstream is encapsulated; and a second encapsulation module 134, configured to encapsulate information of a library picture sample of the LRAP sample into the media container file, wherein the library picture sample is a reference picture sample of the LRAP sample.

In some exemplary embodiments, the media container file includes an LRAP sample group and/or LRAP sample group description, wherein the LRAP sample group and/or the LRAP sample group description contain the information of the LRAP sample in the first video bitstream; or the media container file includes a sync sample data box, wherein the sync sample data box contains the information of the LRAP sample in the first video bitstream; or the media container file includes a Stream Access Point (SAP) sample group, wherein the SAP sample group contains the information of the LRAP sample in the first video bitstream; or the media container file includes a segment index data box, wherein the segment index data box indicates information of the LRAP sample in the first video bitstream contained in a segment of encoded video data of the first video bitstream.

In some exemplary embodiments, the media container file includes an LRAP sample group and/or LRAP sample group description, wherein the LRAP sample group and/or the LRAP sample group description contain the information of the library picture sample of the LRAP sample; or the media container file includes a sync sample data box, wherein the sync sample data box contains the information of the library picture sample of the LRAP sample; or the media container file includes a Stream Access Point (SAP) sample group, wherein the SAP sample group contains the information of the library picture sample of the LRAP sample; or the media container file includes a segment index data box, wherein the segment index data box indicates information of the library picture sample of the LRAP sample contained in a segment of encoded video data of the first video bitstream.

In some exemplary embodiments, the apparatus may further include:

a third encapsulation module, configured to encapsulate a second video bitstream into the media container file, wherein the second video bitstream contains the library picture sample of the LRAP sample.

In some exemplary embodiments, the information of the LRAP sample includes at least one of: an index of the LRAP sample, a stream access point type of the LRAP sample, a quantity of library picture samples of the LRAP sample, and a serial number of each library picture sample of the LRAP sample.

In some exemplary embodiments, the information of the library picture sample includes at least one of: a track identifier corresponding to the library picture sample and a serial number of the library picture sample.

Figure 14:
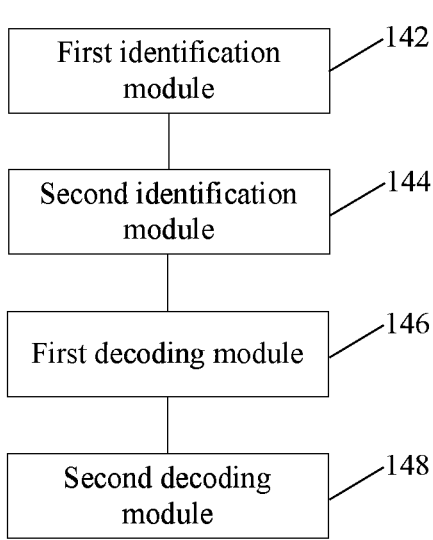
FIG. 14 is a block diagram of a video bitstream decoding apparatus according to the embodiments of the present disclosure.

The embodiments of the present disclosure further provide a video bitstream decoding apparatus. FIG. 14 is a block diagram of a video bitstream decoding apparatus according to the embodiments of the present disclosure. As shown in FIG. 14, the apparatus includes:

a first identification module 142, configured to identify, in a media container file in which a first video bitstream is encapsulated, an LRAP sample in the first video bitstream;

a second identification module 144, configured to identify, in the media container file, a library picture sample of the LRAP sample;

a first decoding module 146, configured to decode the library picture sample; and a second decoding module 148, configured to decode the LRAP sample by using the library picture sample as a reference picture sample.

In some exemplary embodiments, the first identification module 142 is further configured to parse an LRAP sample group and/or LRAP sample group description in the media container file, wherein the LRAP sample group and/or the LRAP sample group description contain information of the LRAP sample; or parse a sync sample data box in the media container file, wherein the sync sample data box contains information of the LRAP sample; or parse a Stream Access Point (SAP) sample group in the media container file, wherein the SAP sample group contains information of the LRAP sample; or parse a segment index data box in the media container file, wherein the segment index data box indicates information of the LRAP sample contained in a segment of encoded video data of the first video bitstream.

In some exemplary embodiments, the second identification module 144 is further configured to:

parse an LRAP sample group and/or LRAP sample group description in the media container file, wherein the LRAP sample group and/or the LRAP sample group description contain the information of the library picture sample of the LRAP sample; or parse a sync sample data box in the media container file, wherein the sync sample data box contains the information of the library picture sample of the LRAP sample; or parse a Stream Access Point (SAP) sample group in the media container file, wherein the SAP sample group contains the information of the library picture sample of the LRAP sample; or parse a segment index data box in the media container file, wherein the segment index data box indicates information of the library picture sample of the LRAP sample contained in a segment of encoded video data of the first video bitstream.

In some exemplary embodiments, the first decoding module 146 is further configured to:

decode, according to the information of the library picture sample of the LRAP sample, a library picture sample of the LRAP sample contained in a second video bitstream encapsulated in the media container file.

In some exemplary embodiments, the information of the LRAP sample includes at least one of: an index of the LRAP sample, a stream access point type of the LRAP sample, a quantity of library picture samples of the LRAP sample, and a serial number of each library picture sample of the LRAP sample.

In some exemplary embodiments, the information of the library picture sample includes at least one of: a track identifier corresponding to the library picture sample and a serial number of the library picture sample.

Figure 15:
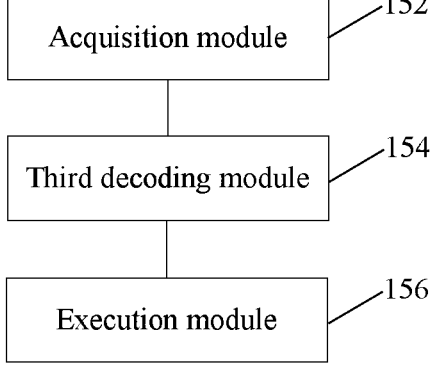
FIG. 15 is a block diagram of a video bitstream access apparatus according to the embodiments of the present disclosure.

The embodiments of the present disclosure further provide a video bitstream access apparatus. FIG. 15 is a block diagram of a video bitstream access apparatus according to the embodiments of the present disclosure. As shown in FIG. 15, the apparatus includes:

an acquisition module 152, configured to acquire an LRAP picture in a first video bitstream, and acquire a library picture of the LRAP picture;

a third decoding module 154, configured to decode the LRAP picture by using the library picture as a reference picture; and an execution module 156, configured to execute random access of the first video bitstream on the decoded LRAP picture.

In some exemplary embodiments, the acquisition module 152 is further configured to:

receive a first segment of encoded video data of the first video bitstream, wherein the first segment contains at least one LRAP picture.

In some exemplary embodiments, the acquisition module 152 is further configured to:

receive a second segment of encoded video data of a second video bitstream, wherein the second segment contains the library picture; or receive a third segment of encoded video data of the first video bitstream, wherein the third segment contains the library picture.

In some exemplary embodiments, the acquisition module 152 is further configured to include:

receive a fourth segment of encoded video data of the first video bitstream, wherein a first subsegment of the fourth segment contains the library picture, and a second subsegment of the fourth segment contains at least one LRAP picture.

In some exemplary embodiments, the acquisition module 152 is further configured to:

receive an index segment of encoded video data of the first video bitstream, wherein the index segment indicates that the LRAP picture is present in a media segment of the encoded video data of the first video bitstream.

In some exemplary embodiments, the acquisition module 152 is further configured to:

receive an index segment of encoded video data of the first video bitstream, wherein the index segment indicates that the library picture is present in a media segment of the encoded video data of the first video bitstream; or receive an index segment of encoded video data of a second video bitstream, wherein the index segment indicates that the library picture is present in a media segment of the encoded video data of the second video bitstream.

In some exemplary embodiments, the apparatus may further include:

a fourth decoding module, configured to decode at least one non-random access point picture, which is subsequent to the LRAP picture in a decoding order and display order, in the first video bitstream, wherein the at least one non-random access point picture does not use any picture preceding the LRAP picture in the decoding order or display order as a reference picture.

The embodiments of the present disclosure further provide a computer-readable storage medium, the computer-readable storage medium storing a computer program, wherein the computer program is configured to execute the operations in any one of the method embodiments when running.

In some exemplary embodiments, the computer-readable storage medium may include, but is not limited to: any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor; wherein the memory stores a computer program, and the processor is configured to run the computer program to execute the operations in any one of the method embodiments above.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the embodiments and exemplary embodiments, and thus they will not be repeated again in the present embodiment.

It is apparent that a person having ordinary skill in the art shall understand that all of the modules or operations in the present disclosure may be implemented by using a general computing apparatus, may be centralized on a single computing apparatus or may be distributed on a network composed of multiple computing apparatuses, and may be implemented by using executable program codes of the computing apparatus. Thus, the program codes may be stored in a storage apparatus and executed by the computing apparatus, and in some cases, the shown or described operations may be executed in a sequence different from that shown herein, or the modules or operations are manufactured into integrated circuit modules, or multiple modules or operations therein are manufactured into a single integrated circuit module for implementation. Thus, the present disclosure is not limited to any specific hardware and software combinations.

The content above merely relates to preferred embodiments of the present disclosure, and is not intended to limit the present disclosure. For a person having ordinary skill in the art, the present disclosure may have various modifications and changes. Any modifications, equivalent replacements, improvements, etc. made within the principle of the present disclosure shall all fall within the scope of protection of the present disclosure.

What is claimed is:

1. A video bitstream encapsulation method, comprising:
encapsulating information of a Library Random Access Point (LRAP) sample in a first video bitstream into a media container file in which the first video bitstream is encapsulated, wherein a reference library picture which satisfies the following characteristic is defined as the LRAP sample: if all library pictures serving as reference pictures can be obtained, all pictures subsequent to the LRAP sample according to a decoding order and a display order can be correctly decoded; and
encapsulating information of a library picture sample of the LRAP sample into the media container file, wherein the library picture sample is a reference picture sample of the LRAP sample.

2. The method according to claim 1, wherein
the media container file comprises an LRAP sample group and/or LRAP sample group description, wherein the LRAP sample group and/or the LRAP sample group description contain the information of the LRAP sample in the first video bitstream; or the media container file comprises a sync sample data box, wherein the sync sample data box contains the information of the LRAP sample in the first video bitstream; or the media container file comprises a Stream Access Point (SAP) sample group, wherein the SAP sample group contains the information of the LRAP sample in the first video bitstream; or the media container file comprises a segment index data box, wherein the segment index data box indicates information of the LRAP sample in the first video bitstream contained in a segment of encoded video data of the first video bitstream.

3. The method according to claim 1, wherein the media container file comprises an LRAP sample group and/or LRAP sample group description, wherein the LRAP sample group and/or the LRAP sample group description contain the information of the library picture sample of the LRAP sample; or the media container file comprises a sync sample data box, wherein the sync sample data box contains the information of the library picture sample of the LRAP sample; or the media container file comprises a Stream Access Point (SAP) sample group, wherein the SAP sample group contains the information of the library picture sample of the LRAP sample; or the media container file comprises a segment index data box, wherein the segment index data box indicates information of the library picture sample of the LRAP sample contained in a segment of encoded video data of the first video bitstream.

4. The method according to claim 1, wherein the method further comprises:

encapsulating a second video bitstream into the media container file, wherein the second video bitstream contains the library picture sample of the LRAP sample.

5. The method according to claim 1, wherein the information of the LRAP sample comprises at least one of: an index of the LRAP sample, a stream access point type of the LRAP sample, a quantity of library picture samples of the LRAP sample, and a serial number of each library picture sample of the LRAP sample;

or, the information of the library picture sample comprises at least one of: a track identifier corresponding to the library picture sample and a serial number of the library picture sample.

6. An electronic apparatus, comprising a memory and a processor, wherein the memory stores a computer program, and the processor is configured to run the computer program so as to execute the method according to claim 1.

7. A non-transitory computer-readable storage medium for storing information related to a first video bitstream, wherein the information related to the first video bitstream comprises a media container file that is generated by using the video bitstream encapsulation method according to claim 1, wherein the following content is encapsulated in the media container file:

the first video bitstream;

information of a Library Random Access Point (LRAP) sample in the first video bitstream, wherein a reference library picture which satisfies the following characteristic is defined as the LRAP sample: if all library pictures serving as reference pictures can be obtained, all pictures subsequent to the LRAP sample according to a decoding order and a display order can be correctly decoded; and information of a library picture sample of the LRAP sample, wherein the library picture sample is a reference picture sample of the LRAP sample.

8. A video bitstream decoding method, comprising:

identifying, in a media container file in which a first video bitstream is encapsulated, a Library Random Access Point (LRAP) sample in the first video bitstream, wherein a reference library picture which satisfies the following characteristic is defined as the LRAP sample: if all library pictures serving as reference pictures can be obtained, all pictures subsequent to the LRAP sample according to a decoding order and a display order can be correctly decoded;

identifying, in the media container file, a library picture sample of the LRAP sample;

decoding the library picture sample; and decoding the LRAP sample by using the library picture sample as a reference picture sample.

9. The method according to claim 8, wherein identifying, in the media container file in which the first video bitstream is encapsulated, the LRAP sample in the first video bitstream comprises:

parsing an LRAP sample group and/or LRAP sample group description in the media container file, wherein the LRAP sample group and/or the LRAP sample group description contain information of the LRAP sample; or parsing a sync sample data box in the media container file, wherein the sync sample data box contains information of the LRAP sample; or parsing a Stream Access Point (SAP) sample group in the media container file, wherein the SAP sample group contains information of the LRAP sample; or parsing a segment index data box in the media container file, wherein the segment index data box indicates information of the LRAP sample contained in a segment of encoded video data of the first video bitstream.

10. The method according to claim 8, wherein identifying the library picture sample of the LRAP sample in the media container file comprises:

parsing an LRAP sample group and/or LRAP sample group description in the media container file, wherein the LRAP sample group and/or the LRAP sample group description contain information of the library picture sample of the LRAP sample; or parsing a sync sample data box in the media container file, wherein the sync sample data box contains information of the library picture sample of the LRAP sample; or parsing a Stream Access Point (SAP) sample group in the media container file, wherein the SAP sample group contains information of the library picture sample of the LRAP sample; or parsing a segment index data box in the media container file, wherein the segment index data box indicates information of the library picture sample of the LRAP sample contained in a segment of encoded video data of the first video bitstream.

11. The method according to claim 10, wherein decoding the library picture sample comprises:

decoding, according to the information of the library picture sample of the LRAP sample, a library picture sample of the LRAP sample contained in a second video bitstream encapsulated in the media container file.

12. The method according to claim 8, wherein
information of the LRAP sample comprises at least one
of: an index of the LRAP sample, a stream access point
type of the LRAP sample, a quantity of library picture
samples of the LRAP sample, and a serial number of
each library picture sample of the LRAP sample;
or,
information of the library picture sample comprises at
least one of: a track identifier corresponding to the
library picture sample and a serial number of the library
picture sample.

13. An electronic apparatus, comprising a memory and a
processor, wherein the memory stores a computer program,
and the processor is configured to run the computer program
so as to execute the method according to claim 8.

14. A video bitstream access method, comprising:
acquiring a Library Random Access Point (LRAP) picture
in a first video bitstream, and acquiring a library picture
of the LRAP picture, wherein a reference library pic-
ture which satisfies the following characteristic is
defined as the LRAP picture: if all library pictures
serving as reference pictures can be obtained, all pic-
tures subsequent to the LRAP picture according to a
decoding order and a display order can be correctly
decoded;
decoding the LRAP picture by using the library picture as
a reference picture; and
executing random access of the first video bitstream on
the decoded LRAP picture.

15. The method according to claim 14, wherein acquiring
the LRAP picture in the first video bitstream comprises:
receiving a first segment of encoded video data of the first
video bitstream, wherein the first segment contains at
least one LRAP picture; or,
receiving an index segment of encoded video data of the
first video bitstream, wherein the index segment indi-
cates that the LRAP picture is present in a media
segment of the encoded video data of the first video
bitstream.

16. The method according to claim 14, wherein acquiring
the library picture of the LRAP picture comprises:

receiving a second segment of encoded video data of a
second video bitstream, wherein the second segment
contains the library picture; or
receiving a third segment of encoded video data of the
first video bitstream, wherein the third segment con-
tains the library picture.

17. The method according to claim 14, wherein acquiring
the LRAP picture in the first video bitstream, and acquiring
the library picture of the LRAP picture comprises:
receiving a fourth segment of encoded video data of the
first video bitstream, wherein a first subsegment of the
fourth segment contains the library picture, and a
second subsegment of the fourth segment contains at
least one LRAP picture.

18. The method according to claim 14, wherein acquiring
the library picture of the LRAP picture comprises:
receiving an index segment of encoded video data of the
first video bitstream, wherein the index segment indi-
cates that the library picture is present in a media
segment of the encoded video data of the first video
bitstream; or
receiving an index segment of encoded video data of a
second video bitstream, wherein the index segment
indicates that the library picture is present in a media
segment of the encoded video data of the second video
bitstream.

19. The method according to claim 14, wherein after
decoding the LRAP picture by using the library picture as
the reference picture, the method further comprises:
decoding at least one non-random access point picture,
which is subsequent to the LRAP picture in a decoding
order and display order, in the first video bitstream,
wherein the at least one non-random access point
picture does not use any picture preceding the LRAP
picture in the decoding order or display order as a
reference picture.

20. An electronic apparatus, comprising a memory and a
processor, wherein the memory stores a computer program,
and the processor is configured to run the computer program
so as to execute the method according to claim 14.

* * * * *